United States Patent [19]

Kelley et al.

[11] Patent Number: 5,132,921

[45] Date of Patent: Jul. 21, 1992

[54] HIGH SPEED DIGITAL COMPUTING SYSTEM

[75] Inventors: Edwin A. Kelley, Los Angeles; Howard H. Baller, Marina del Rey; Randall L. Conilogue, Thousand Oaks, all of Calif.

[73] Assignee: Hughes Aircraft Company, Los Angeles, Calif.

[21] Appl. No.: 434,612

[22] Filed: Nov. 13, 1989

Related U.S. Application Data

[63] Continuation of Ser. No. 89,181, Aug. 25, 1987, abandoned.

[51] Int. Cl.$^5$ .............................................. G06F 7/50
[52] U.S. Cl. .................................... 364/784; 364/786
[58] Field of Search ............................. 364/788–786, 364/784, 768

[56] References Cited

U.S. PATENT DOCUMENTS

| | | | |
|---|---|---|---|
| 3,519,810 | 7/1970 | Priel et al. | 364/784 |
| 3,535,502 | 10/1970 | Clapper | 364/786 X |
| 3,700,875 | 10/1972 | Saenger et al. | 364/787 |
| 4,052,604 | 10/1977 | Maitland et al. | 364/786 |
| 4,215,418 | 7/1980 | Muramatsu | 364/784 X |
| 4,228,520 | 10/1980 | Letteney et al. | 364/786 X |
| 4,449,197 | 5/1984 | Henry et al. | 364/786 X |
| 4,675,837 | 6/1987 | Ulbrich et al. | 364/788 |
| 4,677,584 | 6/1987 | Steck | 364/784 |
| 4,689,763 | 8/1987 | Fang | 364/784 |
| 4,740,907 | 4/1988 | Shimizu et al. | 364/784 |

FOREIGN PATENT DOCUMENTS

| | | |
|---|---|---|
| 214836 | 3/1987 | European Pat. Off. |
| 3524797 | 1/1987 | Fed. Rep. of Germany |
| 86/04699 | 8/1986 | PCT Int'l Appl. |
| 1191906 | 11/1985 | U.S.S.R. ............ 364/786 |

OTHER PUBLICATIONS

Shen, D. T. et al., "4-2 Carry-Save Adder Implementation Using Send Circuits", *IBM Technical Disclosure Bulletin;* vol. 20, No. 9; Feb. 1978; pp. 3594–3597.

Weinberger, A.; "4-2 Carry-Save Adder Module"; *IBM Technical Disclosure Bulletin;* vol. 23, No. 8; Jan. 1981; pp. 3811–3814.

Beraud, J. P. et al., "High Speed Accumulator"; *IBM Technical Disclosure Bulletin;* vol. 17, No. 1; Jun. 1974; pp. 118–119.

*Primary Examiner*—Eugene R. LaRoche
*Assistant Examiner*—Benny T. Lee
*Attorney, Agent, or Firm*—Leonard A. Alkov; Wanda K. Denson-Low

[57] ABSTRACT

A digital computing system comprises first, second, third, fourth, fifth, and sixth multi-bit binary signal sources and first and second binary adders. Each binary adder has a plurality of parallel stages equal in number to the bits of the signals. Each stage of each adder has a first full adder and a second full adder. Each full adder has an addend input, an augend input, a carry input, a sum output, and a carry output. In the first adder, the first source is connected to the addend input of the first full adder, the second source is connected to the augend input of the first full adder, the third source is connected to the carry input of the first full adder, the sum output of the first full adder is connected to the addend input of the second full adder, the carry output of the first full adder is connected to the carry input of the next higher order stage of the second full adder, and the fourth source is connected to the augend input of the second full adder. The full adders are implemented with low-level, non-saturating, bipolar differential logic circuitry, which greatly reduces the power dissipation at high data processing speeds. The circuitry is physically laid out on an integrated circuit chip so the stages within an adder are contiguous to each other in bit order and/or the corresponding stages of different adders are aligned with each other.

4 Claims, 5 Drawing Sheets

HIGH SPEED DIGITAL COMPUTING SYSTEM

This application is a continuation of application Ser. No. 07/089,18 filed Aug. 25, 1987, now abandoned.

BACKGROUND OF THE INVENTION

This invention pertains to the field of digital computing and, more particularly, to a large scale digital computing system capable of performing high-speed addition without unduly increasing power consumption.

Addition is a fundamental operation in the arithmetic unit of a digital computing system because it is employed to perform, not only the addition function, but also the multiplication function and the accumulation function. In a conventional adder, the processing time is directly related to the number of bits in the numbers being processed because of the necessity for carries to propagate from stage to stage before the arithmetic result is generated. A number of schemes have been developed over the years, such as the so-called look ahead adder, to generate arithmetic results without the delays occasioned by carry propagation. These schemes require a great deal of extra electronic circuitry and, therefore, dissipate more power than a conventional adder.

SUMMARY OF THE INVENTION

According to the invention, sum and carry computations are processed separately during the execution of a plurality of arithmetic operations in tandemly-connected arithmetic units so that carry propagation delay only occurs once, namely, at the end of the multi-operation computation. In the preferred embodiment, a digital computing system comprises first, second, third, fourth, fifth, and sixth multi-bit binary signal sources and first and second binary adders. The sum of the first and second signals represents a first binary number to be added. The sum of the third and fourth signals represents a second binary number to be added. The sum of the fifth and sixth signals represents a third binary number to be added. Each binary adder has a plurality of parallel stages equal in number to the bits of the signals. Each stage of each adder has a first full adder and a second full adder. Each full adder has an addend input, an augend input, a carry input, a sum output, and a carry output. In the first adder, the first source is connected to the addend input of the first full adder, the second source is connected to the augend input of the first full adder, the third source is connected to the carry input of the first full adder, the sum output of the first full adder is connected to the addend input of the second full adder, the carry output of the first full adder is connected to the carry input of the second full adder of the next higher order stage, and the fourth source is connected to the augend input of the second full adder.

A feature of the invention is implementation of the full adders with low-level, non-saturating, bipolar differential logic circuitry, which greatly reduces the power dissipation at high data processing speeds. Separate processing of sum and carrier computations and use of currently available low-level logic circuitry permits something on the order of one billion arithmetic operations per second to be carried out with an average power dissipation of only about one watt.

The foregoing measures increase the number of wire interconnections fourfold. A doubling of the wire interconnections results from the separate processing of carry and sum signals, and a doubling of the wire interconnections results from the use of bipolar logic circuitry. To better organize and route this increased number of wire interconnections, a feature of the invention is the physical layout of the circuitry on an integrated circuit chip so the stages within an adder are contiguous to each other in bit order and/or the corresponding stages of different adders are aligned with each other.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENTS

Figure 1:
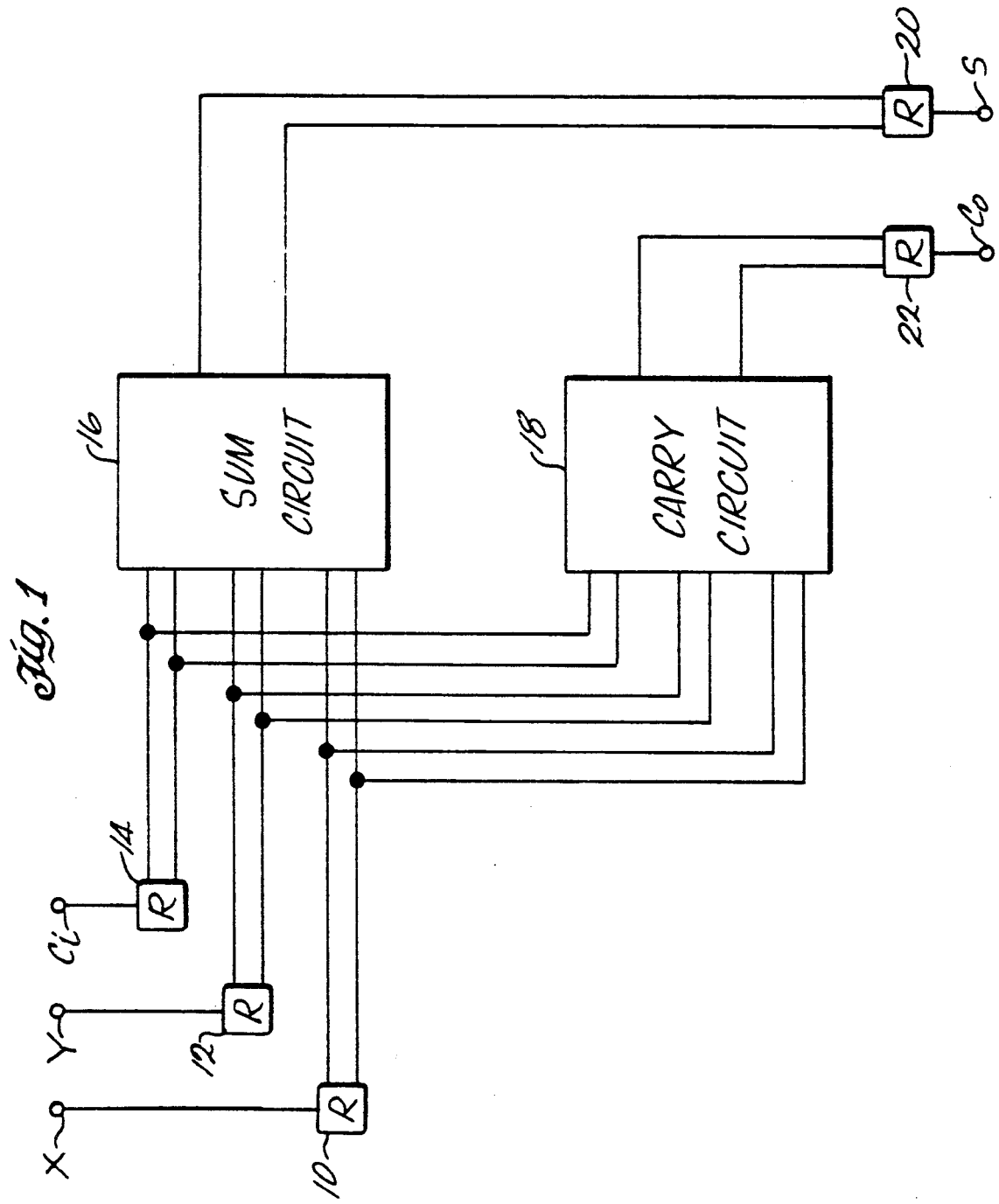
FIG. 1 is a block diagram of one stage of a full adder that employs low-level, non-saturating, bipolar differential logic circuitry.

In FIG. 1, one stage of a full adder implemented with low-level, non-saturating, bipolar differential logic circuitry is shown. Such a full-adder stage is the basic building block from which the preferred embodiment of the invention is implemented. Single-ended input terminals X, Y, and $C_i$ are connected to registers 10, 12, and 14, which have complementary outputs. One bit of a binary addend signal to be added is applied to terminal X. The corresponding bit of a binary augend signal to be added is applied to terminal Y. The next lower order bit of a binary carry signal is applied to terminal $C_i$. The complementary outputs of registers 10, 12, and 14 are connected to a sum circuit 16 and a carry circuit 18. Sum circuit 16 and carry circuit 18 perform the well-known logical functions required to generate a binary sum value and a binary carry value from the signals applied to terminals X, Y, and $C_i$. These logical functions are described, for example, on page 161 of *Digital Computer Fundamentals*, Second Edition, by Thomas C. Bartee, McGraw-Hill Book Company, 1966. The complementary outputs from sum circuit 16 and carry circuit 18 are connected to registers 20 and 22, respectively, to transform them to single-ended form. Thus, register 20 has an output terminal S at which one bit of a binary sum signal appears, and register 22 has an output terminal $C_o$ at which one bit of a binary carry signal appears.

FIG. 1 illustrates how the use of complementary signals doubles the number of wire interconnections vis-a-vis single-ended signals. In the preferred embodiment of the invention, data transmission from stage to stage of an adder and between successive adders is carried out by complementary signals within an integrated circuit chip. As taught in a co-pending, commonly-assigned patent of Kelley and Stone entitled High-Speed Digital Data Communication System U.S. Pat. No. 4,941,153, issued Jul. 10, 1990, the complementary signals are transformed to single-ended signals only to make inter-chip connections or at the end of the computation.

Figure 2:
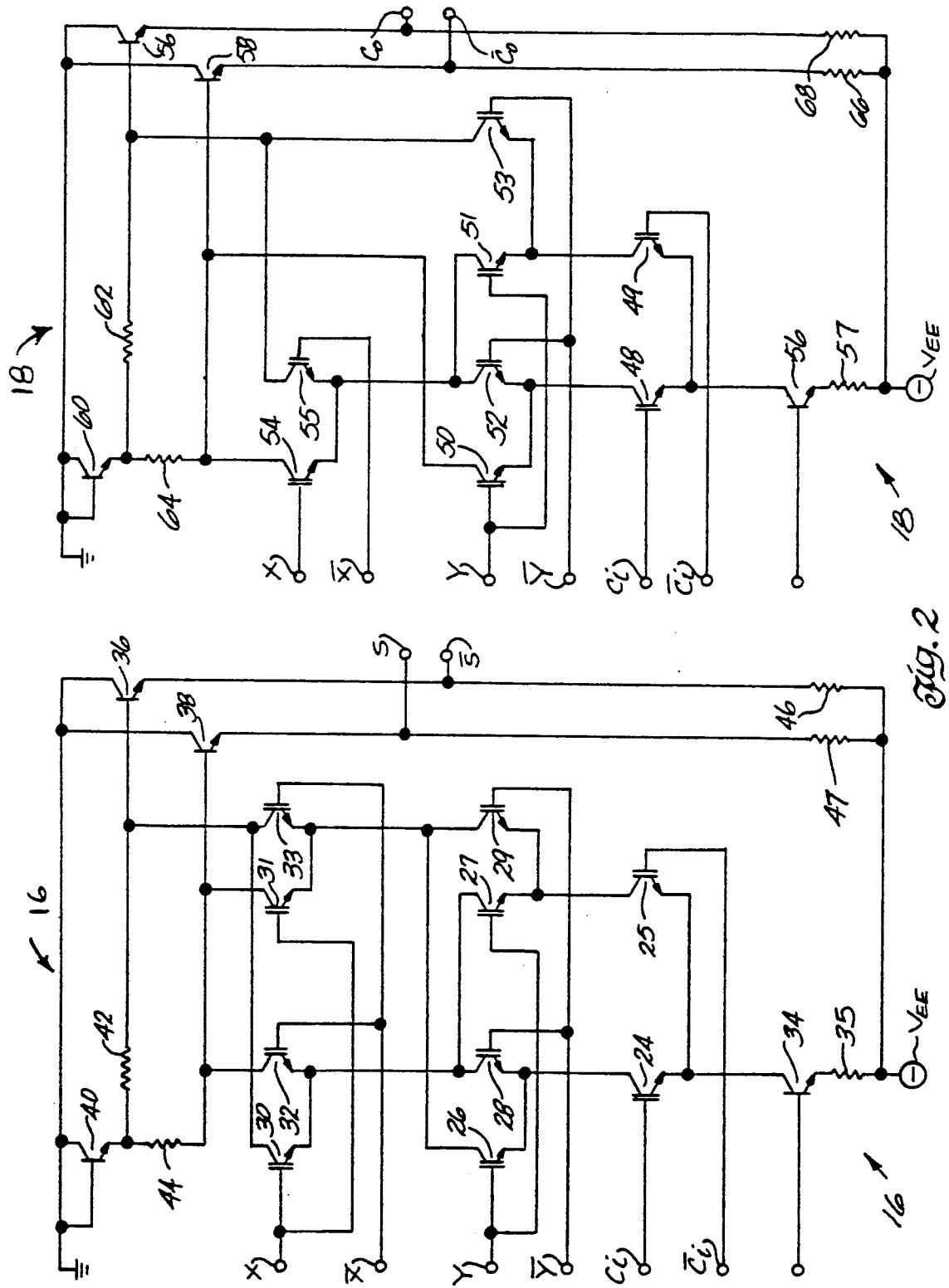
FIG. 2 is a schematic circuit diagram of the circuitry of FIG. 1.

In FIG. 2, sum circuit 16 is implemented by a hierarchy of transistors 24–34, 36, 38, 40. The emitters of transistors 24 and 25 are connected to the collector of a transistor 34. The emitter of transistor 34 is connected through a resistor 35 to a source of negative bias potential $V_{EE}$. The base of transistor 34 is connected to a conventional bias voltage source $V_b$ that compensates for changes in the characteristics of the circuitry with changing temperature as described in the above-identified co-pending application. The disclosure of said application is incorporated fully herein by reference. Input terminal $C_i$ is connected to the base of transistor 24, and complementary input terminal $\overline{C}_i$ is connected to the base of transistor 25. Input terminal Y is connected to the bases of transistors 26 and 27. Complementary input terminal $\overline{Y}$ is connected to the bases of transistors 28 and 29. The emitters of transistors 26 and 28 are connected to the collector of transistor 24. The emitters of transistors 27 and 29 are connected to the collector of transistor 25. Input terminal X is connected to the bases of transistors 30 and 31. Complementary input terminal $\overline{X}$ is connected to the bases of transistors 32 and 33. The emitters of transistors 30 and 32 are connected to the collectors of transistors 27 and 28. The emitters of transistors 31 and 33 are connected to the collectors of transistors 26 and 29. The collectors of transistors 30 and 33 are connected to the base of an output transistor 36. The collectors of transistors 31 and 32 are connected to the base of an output transistor 38. The collectors of transistors 36 and 38 and the base and collector of a transistor 40 are connected to ground. The emitter of transistor 40 is connected by a resistor 42 to the base of transistor 36. The emitter of transistor 40 is also connected by a resistor 44 to the base of transistor 38. The emitters of transistors 36 and 38 are connected to bias source $V_{EE}$ by resistors 46 and 47, respectively. Output terminal S is connected to the junction of the emitter of transistor 36 and resistor 46. Complementary output terminal $\overline{S}$ is connected to the junction of the emitter of transistor 38 and resistor 47.

Carry circuit 18 is implemented by a hierarchy of transistors 48–56, 58–60. The emitters of transistors 48 and 49 are connected to the collector of a transistor 56. The emitter of transistor 56 is connected through a resistor 57 to source $V_{EE}$. The base of transistor 56 is connected to a conventional bias voltage source that compensates for changes in the characteristics of the circuitry with changing temperature as described in the above-identified co-pending application. Input terminal $C_i$ is connected to the base of transistor 48, and complementary input terminal $\overline{C}_i$ is connected to the base of transistor 49. Input terminal Y is connected to the bases of transistors 50 and 51. Complementary input terminal $\overline{Y}$ is connected to the bases of transistors 52 and 53. The emitters of transistors 50 and 52 are connected to the collector of transistor 48. The emitters of transistors 51 and 53 are connected to the collector of transistor 49. Input terminal X is connected to the base of transistor 54. Complementary input terminal $\overline{X}$ is connected to the base of transistor 55. The emitters of transistors 54 and 55 are connected to the collectors of transistors 51 and 52. The collectors of transistors 50 and 54 are connected to the base of an output transistor 58. The collectors of transistors 53 and 55 are connected to the base of an output transistor 59. The collectors of transistors 58 and 59 and the base and collector of a transistor 60 are connected to ground. The emitter of transistor 60 is connected by a resistor 62 to the base of transistor 59. The emitter of transistor 60 is connected by a resistor 64 to the base of transistor 58. The emitters of transistors 58 and 59 are connected to bias source $V_{EE}$ by resistors 66 and 68, respectively. Output terminal $C_o$ is connected to the junction of the emitter of transistor 59 and resistor 68. Complementary output terminal $\overline{C}_o$ is connected to the junction of the emitter of transistor 59 and resistor 66.

Transistors 24 to 33 and 48 to 55 are preferably operated in a non-saturating linear mode with a low-level voltage swing of the order of 130–200 millivolts. Typically, these transistors could be FAST-Z FINELINE transistor type VN5H2ll, with the remaining transistors being type VN5H111.

Figure 3:
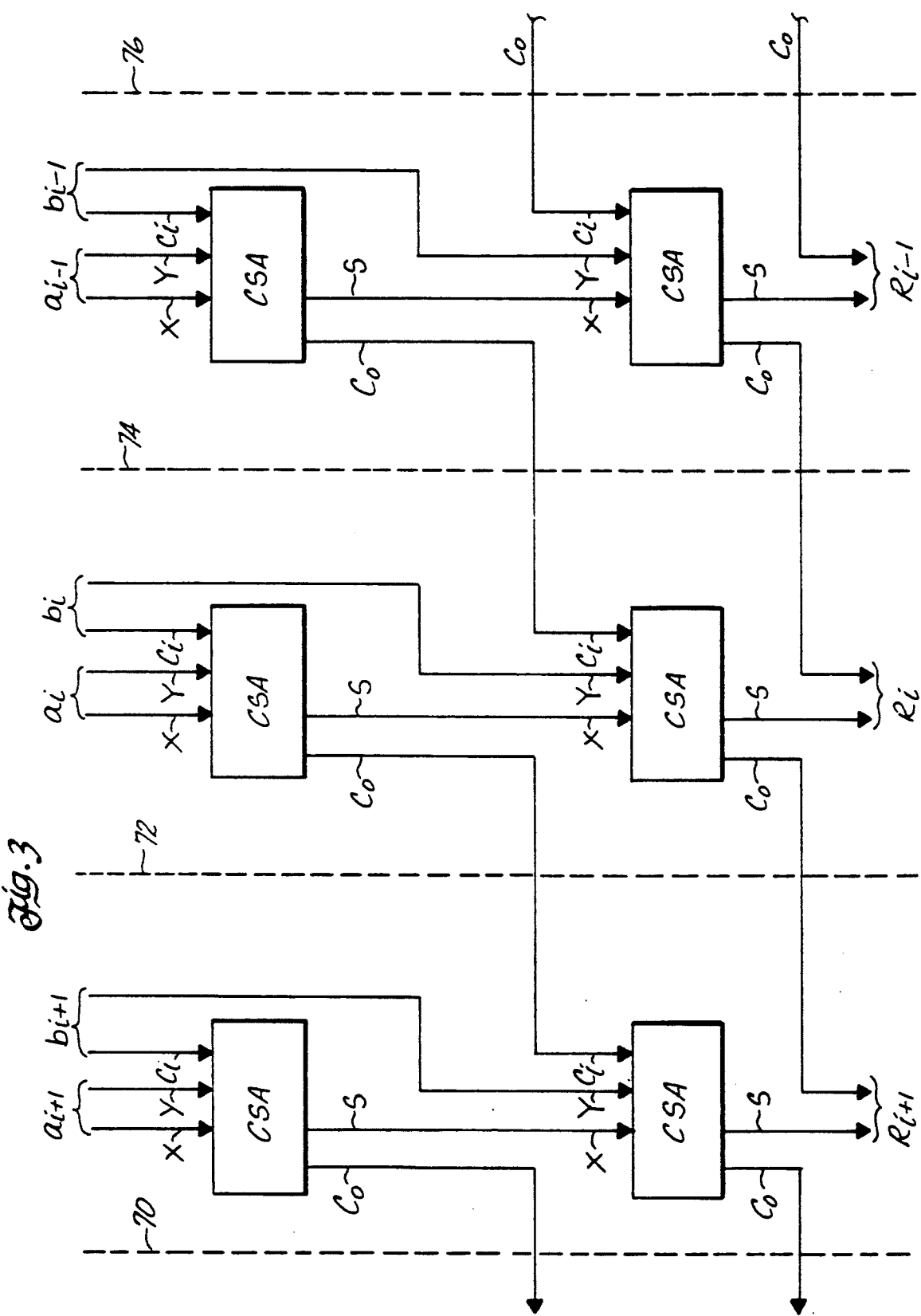
FIG. 3 is a schematic block diagram of three stages of an adder incorporating principles of the invention.

In FIG. 3 is shown three stages of an adder incorporating principles of the invention. These stages, separated by vertical broken lines 70, 72, 74, 76, process three bits, designated $i-1$, i, and $i+1$, of a multi-bit binary addend signal a and a multi-bit binary augend signal b to be added (where i could be a positive or negative number designating the denominational order of the particular bit in question). Each stage comprises two full adders (CSA). Each full adder is preferably implemented as described in FIGS. 1 and 2. Addend signal a comprises two component binary signals, a sum signal and a carry signal. The sum of these component signals represents one of the binary numbers to be added. Augend signal b also comprises two component binary signals, a sum signal and a carry signal. The sum of these component signals represents the other binary number to be added.

Although the binary signals are represented as single ended, in practice they are preferably bipolar in nature so as to utilize the logic circuitry described above. Each stage of the adder has first and second full adders, preferably of the type disclosed in FIG. 2, each CSA having complementary input terminals X, Y and $C_i$, and output terminals $C_o$ and S. At each stage, one bit of the complementary sum component signal a is applied to complementary input terminals X, the corresponding bit of the complementary carry component signal a is applied to complementary input terminals Y, and the corresponding bit of the complementary sum component signal b is applied to complementary input terminals $C_i$ of the first CSA. The complementary signals at output terminals $C_o$ of one bit of the first CSA are applied to complementary input terminals $C_i$ of the second CSA of the stage for the next higher order bit. The complementary signals at output terminals S of the first CSA are applied to complementary input terminals X of the second CSA of the same stage. The corresponding bit of the complementary carry component signal b is applied to complementary input terminals Y of the second CSA. (Alternatively, the carry component signal b could be applied to input terminal $C_i$ of the first CSA and the sum component signal b could be applied to input terminal Y of the second CSA.) Each bit of the resultant signal R generated by the adder comprises a sum component and a carry component as represented in FIG. 3 by $R_i-1$, $R_i$, $R_i+1$. For each stage, the complementary signals at output terminal S comprise the sum component of the resultant signal for the bit, e.g., the "i" bit, and the complementary signals generated at output terminal $C_o$ of the next lower order stage, e.g., the "i−1" bit, comprise the carry component of the resultant signal for that bit.

In summary, the entire addition process is completed without propagation of carries with an execution time that is independent of the word length of the addend and augend signals. Specifically, the execution time is the sum of the delay times through the first CSA and the second CSA.

Figure 4:
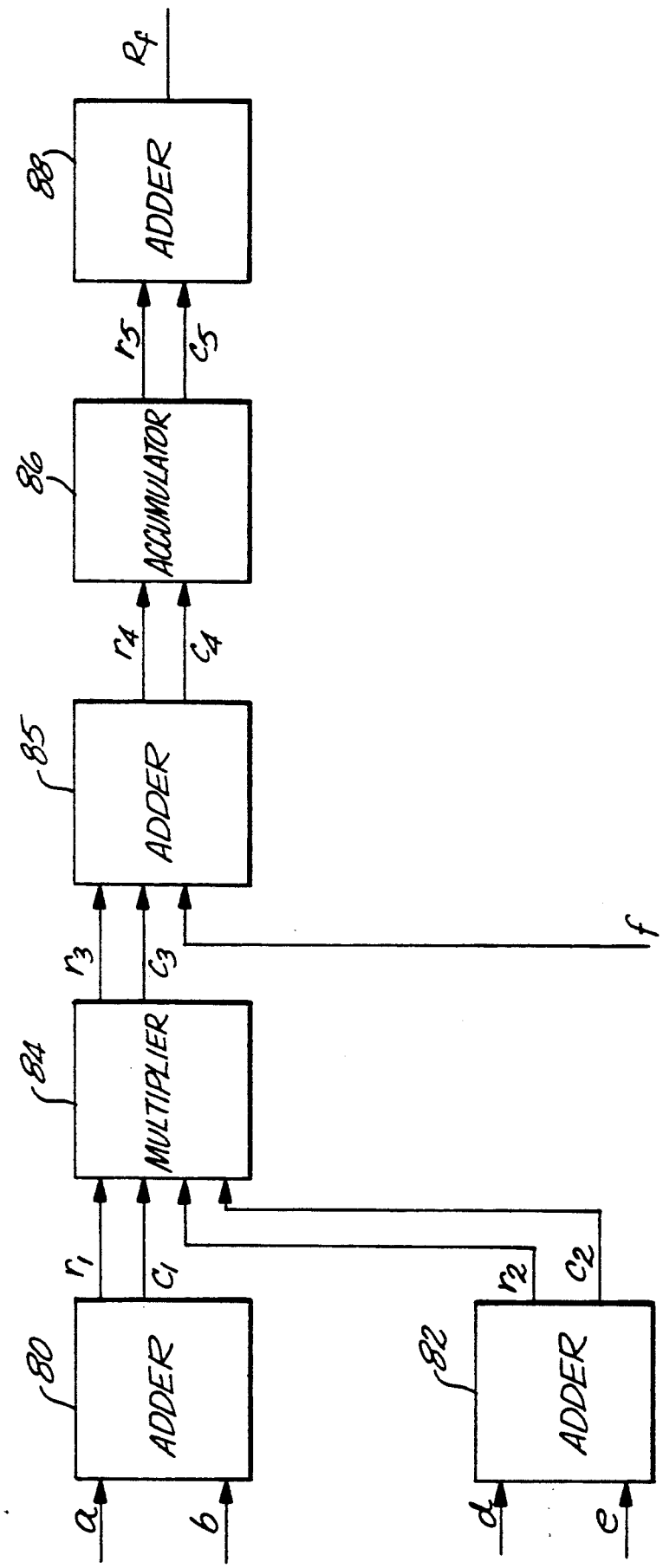
FIG. 4 is a schematic block diagram of a digital computing system incorporating a number of adders of the type disclosed in FIG. 3.

The invention contemplates a digital computing system that employs a plurality of the adders described in connection with FIG. 3 connected in tandem to perform arithmetic operations such as addition, multiplication, and accumulation. FIG. 4 illustrates a typical digital computing system utilizing the adders of FIG. 3. A multi-bit binary addend signal a and a multi-bit binary augend signal b are applied to an arithmetic unit, i.e., an adder 80 constructed as shown in FIG. 3. Similarly, a multi-bit binary addend signal d and a multi-bit binary augend signal e are applied to another arithmetic unit, i.e., an adder 82 constructed as shown in FIG. 3. Typically, since binary signals a, b, d, and e are input signals to the computing system, they would not have a carry component, although they could. Assuming that they do not have a carry component, one input of the first CSA and one input of the second CSA of each stage, e.g., input terminal Y in FIG. 3, would not be used, or a binary carry component signal representing the number zero would be applied to these input terminals. Adder 80 generates a multi-bit binary component sum signal $r_1$ and a multi-bit binary component carry signal $c_1$. The sum of signals $r_1$ and $c_1$ represents the sum of the numbers represented by signals a and b. Similarly, adder 82 generates a multi-bit binary component sum signal $r_2$ and a multi-bit binary component carry signal $c_2$.

Signals $r_1$, $c_1$, $r_2$, and $c_2$ are applied to another arithmetic unit, i.e., a multiplier 84. Multiplier 84 can be constructed from a number of adders of the type shown in FIG. 3 as building blocks using conventional techniques for digital multiplication such as, for example, the so-called Booth algorithm. Generally, multiplier 84 would have a number of adders of the type shown in FIG. 3 equal to the bits in the numbers being multiplied. Signal $r_1$ serves as a sum component multiplicand signal, signal $c_1$ serves as a carrier component multiplicand signal, signal $r_2$ serves as a sum component multiplier signal, and signal $c_2$ serves as a carrier component multiplier signal. Multiplier 84 generates a multi-bit binary component product signal $r_3$ and a multi-bit binary component carry signal $c_3$. Each adder used in multipler 84 separately adds a binary sum component signal and a binary carry component signal to another binary signal (with or without components) to produce a separate binary component sum signal and a binary component carry signal. As a result, the time required to complete the multiplication process is dramatically reduced vis-a-vis a conventional multiplier because the carry bits do not propagate from stage to stage. The more bits in the binary signals being processed, the greater the reduction in processing time vis-a-vis a conventional arithmetic unit because the processing time is independent of the number of bits in the binary signals being processed.

Binary signal $r_3$ is applied to an adder 85 as a component addend signal, binary signal $c_3$ is applied to adder 85 as a component addend signal, and a binary augend signal f is applied to adder 85 to be additively combined with the component addend signals. Depending upon the source of signal f, i.e., whether or not it was the subject of previous processing in the computing system, it could also comprise two component signals. In either case, adder 85, configured as shown in FIG. 3, generates a multi-bit binary component sum signal $r_4$ and a multi-bit binary component carry signal $c_4$. The sum of the numbers represented by signals $r_4$ and $c_4$ represents the sum of the numbers represented by signals $r_3$, $c_3$, and f.

Binary signals $r_4$ and $c_4$ are applied to an accumulator 86. Accumulator 86, which comprises the adder shown in FIG. 3, an output register for storing sum and carry components of such an adder, and feedback connections to the inputs of the adder, performs the conventional accumulating function of repeatedly adding the sum stored in the output register to the input signal applied to the accumulator. Signal $r_4$ serves as one component of the signal to be accumulated, and signal $c_4$ serves as the other component of the signal to be accumulated. Accumulator 86 generates a multi-bit binary component signal $r_5$, which is the accumulation of the component sum signals generated by the adder, and a multi-bit binary component signal $c_5$, which is the accumulation of the component carry signals generated by the adder. As a result, the time required to complete the accumulation process is dramatically reduced vis-a-vis a conventional accumulator because the carry bits do not propagate from stage to stage. The more bits in the binary signals being processed, the greater the reduction in processing time vis-a-vis a conventional arithmetic unit because the processing time is independent of the number of bits in the binary signals being processed.

Signals $r_5$ and $c_5$ are applied to a conventional adder 88, which forms a single, multi-bit binary sum signal $R_f$. In summary, although the illustrated computing system employs numerous adders in performing the arithmetic operations of addition, multiplication and accumulation, only one adder, namely, adder 88, incurs the delay occasioned by propagation of carries through its stages. Thus, the processing time is dramatically reduced.

Figure 5:
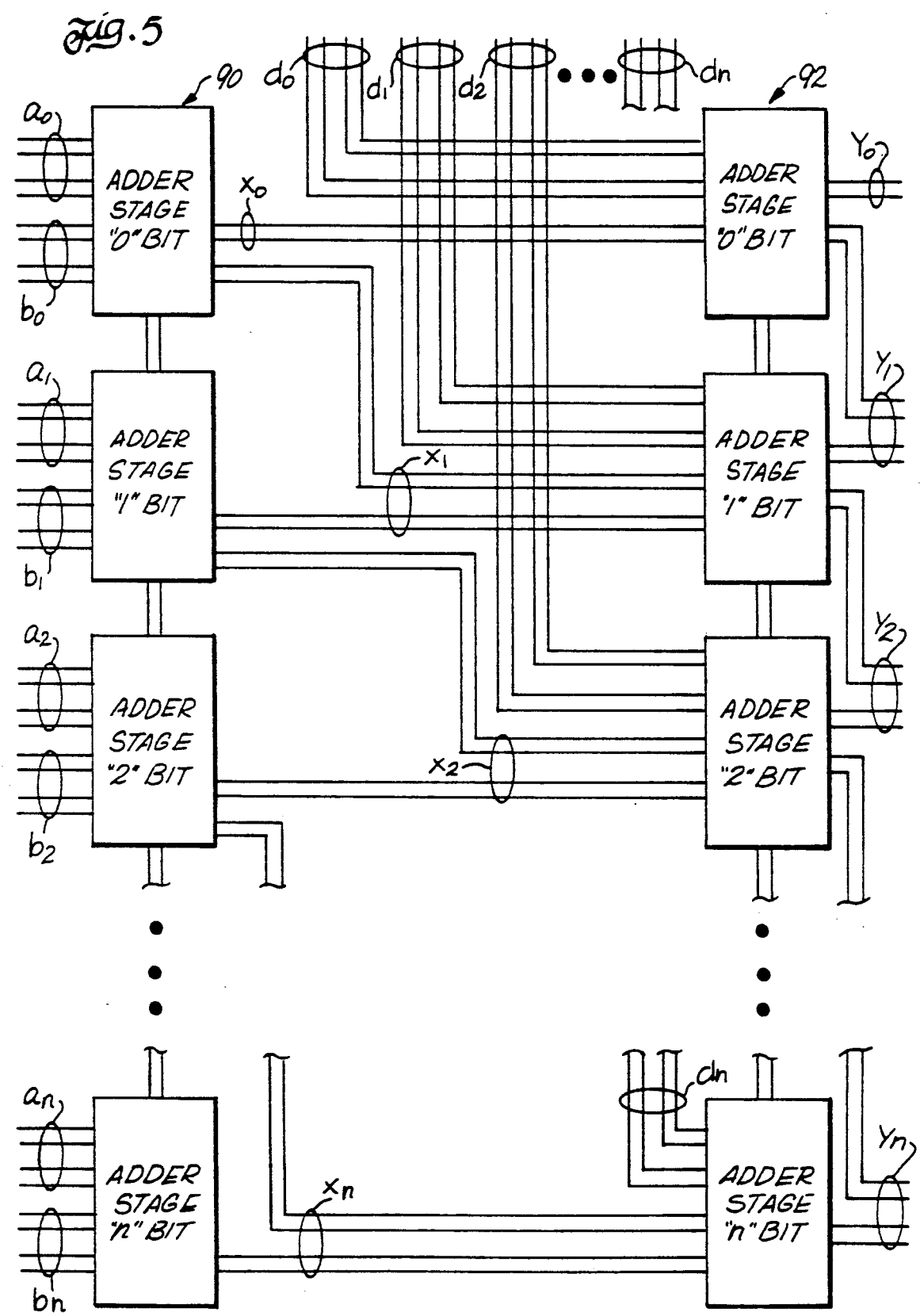
FIG. 5 is a schematic block diagram illustrating on an integrated circuit chip the layout of stages within an adder and stages of adjacent adders.

The use of complementary signals and sum and carry components increases the wire interconnections fourfold relative to a conventional carry-propagating adder implemented with single-ended logic circuitry. In order to minimize the complexity of the wire interconnections between stages, the stages of each adder are laid out on an integrated circuit chip in physically contiguous relationship to each other in bit order, and the same order stages of tandemly connected adders are laid out on the integrated circuit chip in physically aligned relationship with each other. This is illustrated in FIG. 5 where an adder 90 is connected in tandem with an adjacent adder 92. Adder 90 has individual adder stages for processing a "0" bit, a "1" bit, a "2" bit, . . . and an "n" bit. Adder 92 has individual adder stages for processing a "0" bit, a "1" bit, a "2" bit, . . . and an "n" bit. Each adder stage is preferably constructed as shown in FIGS. 2 and 3. Other circuit components of an arithmetic unit, such as registers, multiplier related logic circuitry, and accumulator feedback connections, have been omitted for simplicity. These would also be individualized on the integrated circuit chip for each stage and, thus, be laid out in physically contiguous relationship to each other in bit order and in physically aligned relationship with the other circuit components of the same bit. In other words, the circuit components are laid out on the chip in a grid of rows and columns-the rows comprising the same order bits of different circuit components and the columns comprising different order bits of the same circuit components.

As illustrated, the stages of adder 90 and the stages of adder 92, respectively, are physically contiguous to each other in bit order, e.g., the "0" bit stage is contiguous to the "1" bit stage, and the "1" bit stage is contiguous to the "2" bit stage, etc. Similarly, the same order stages of adjacent, tandemly-connected adders are physically aligned with each other, e.g., the "0" bit stage of adder 90 is physically aligned with the "0" bit stage of adder 92, and the "1" bit stage of adder 90 is physically aligned with the "1" bit stage of adder 92, etc. As used herein, the term "aligned" means either directly aligned or aligned with a constant offset.

FIG. 5 also illustrates the number of signals processed by the stages of adders 90 and 92. Adder 90 operates upon a multi-bit binary addend signal a and a multi-bit binary augend signal b. Each bit of signal a and signal b comprises two bipolar, i.e., complementary, component (e.g., sum and carry) signals. Each bit of signal a and each bit of signal b are applied to the corresponding bit stage of adder 90, e.g., signals $a_1$ and $b_1$ are applied to the "1" bit stage of adder 90. Thus, as indicated at $a_1$ and as indicated at $b_1$, four augend signals are applied to the "1" bit stage of adder 90. In other words, a total of eight signals are applied to each stage of adder 90. Adder 90 generates a multi-bit binary signal x that represents the sum of the addend and augend signals. Each stage generates four bipolar, i.e., complementary, component (e.g. sum and carry) signals. The component sum signal from each stage is used with the component carry signal from the next lower bit stage to form the input to the same order stage of the adjacent tandemly-connected adder, e.g., the sum component from the "1" bit stage and the carry component from the "0" bit stage of adder 90 together form the four signals designated $x_1$, and the sum component from the "2" bit stage and the carry component from the "1" bit stage of adder 92 together form the four signals designated $y_2$. A multi-bit binary addend signal d is processed with signal x in adder 92. As illustrated, each bit of signal d comprises two bipolar, i.e., complementary, component (e.g., sum and carry) signals. Each bit of signal d and each bit of signal x are applied to the corresponding bit stage of adder 92, e.g., signals $d_2$ and $x_2$ are applied to the "2" bit stage of adder 92.

What is claimed is:

1. A digital computing system with a first single-bit signal source, wherein the first single bit is represented by a binary addend signal which is provided as current differential between a first terminal X and a complementary first terminal $\overline{X}$, a second single-bit signal source, wherein the second single bit is represented by a binary addend signal which is provided as current differential between a second terminal Y and a complementary second terminal $\overline{Y}$, a multi-bit output signal, wherein each bit of the output signal is represented by a bipolar signal which is provided as current differential between an output terminal S and a complementary output terminal $\overline{S}$, comprising:

a single-bit arithmetic means for combining the first and second single-bit input signal sources to produce said multi-bit output signal, said single-bit arithmetic means comprises sum circuit means and carry circuit means;

said sum circuit means comprises a plurality of first transistors, each transistor having respective base, emitter and collector, wherein said first plurality includes said emitters of first (24) and second (25) transistors being connected to said collector on eleventh transistor (34), said emitter of said eleventh transistor (34) being connected through first resistor (35) to a source of electrical potential ($V_{EE}$), said base of said eleventh transistor (34) being connected to bias voltage source ($V_b$), carry input terminal ($C_j$) being connected to said base of said first transistor (24) and complementary carry input terminal ($\overline{C}_j$) being connected to said base of said second transistor (25) to provide a carry input signal, second input terminal (Y) being connected to said bases of third (26) and fourth (27) transistors, complementary second input terminal ($\overline{Y}$) being connected said bases of fifth (28) and sixth (29) transistors, said emitters of third (26) and said fifth (28) transistors being connected to said collector of said first transistor (24), said emitters of said fourth transistor (27) and sixth transistor (29) being connected to said collector of said second transistor (25), first input terminal (X) being connected to said bases of seventh (30) and eighth (31) transistors, complementary first input terminal ($\overline{X}$) being connected to said bases of ninth (32) and tenth (33) transistors, said emitters of seventh (30) and ninth (32) transistors being connected to said collectors of said fourth (27) and fifth (28) transistors, said emitters of said eighth (31) and tenth (33) transistors being connected to collectors of said third (26) and said sixth (29) transistors, said collectors of said seventh (30) and said tenth (33) transistors being connected to said base of first output transistor (36), said collectors of said eighth (31) and said ninth (32) transistors connected to said base of second output transistor (38), said collectors of said first and second output transistors (36, 38) and said base and said collector of twelfth transistor (40) being connected to ground, said emitter of said twelfth transistor (40) being connected by second resistor (42) to said base of said first output transistor (36), said emitter of said twelfth transistor (40) also being connected by third resistor (44) to said base of said second output transistor (38), said emitters of said first (36) and said second (38) output transistors being connected to said electrical source ($V_{EE}$) by fourth and fifth resistors (46, 47) respectively, complementary output terminal ($\overline{S}$) being connected to junction of said emitter of said second output transistor (38) and fifth resistor (47), and output terminal (S) being connected to junction of said emitter of said first output transistor (36) and said fourth resistor (46); and said carry circuit means comprises a second plurality of transistors, each transistor having respective base, emitter and collector, wherein said second plurality includes said emitters of first transistor (48) and second transistor (49) being connected to said collector of third output transistor (56), said emitter of said third output transistor (56) being connected through first resistor (57) to voltage source ($V_{EE}$), said base of said third output transistor (56) being connected to said bias voltage source $V_b$, carry input terminal ($C_j$) being connected to said base of said first transistor (48), complementary carry input terminal ($\overline{C}_j$) being connected to said base of said second transistor (49) to provide the carry input signal, second input terminal (Y) being connected to said bases of third (50) and fourth (51) transistors, complementary second input terminal ($\overline{Y}$) being connected to said bases of fifth (52) and sixth (53) transistors, said emitters of said third (50) and fifth (52) transistors being connected to said collector of said first transistor (48), said emitters of said fourth (51) and sixth (53) transistors being connected to said collector of said second transistor (49), first input terminal (X) being connected to said base of seventh transistor (54), first complementary input terminal ($\overline{X}$) being connected to said base of eighth transistor (55), said emitters of said seventh (54) and eighth (55) transistors being connected to said collectors of said fourth (51) and fifth (52) transistors, said collectors of said third (50) and seventh (54) transistors being connected to said base of said second output transistor (58), said collectors of said sixth (53) and eighth (55) transistors being connected to said base of first output transistor (59), said collectors of said second and first output transistors (58, 59) and said base and said collector of ninth transistor (60) being connected to ground, said emitter of said ninth transistor (60) being connected by second resistor (62) to said base of said first output transistor (59), said emitter of said ninth transistor (60) being connected by third resistor (64) to said base of said second output transistor (58), said emitters of said first and second output transistors (59, 58) being connected to said electrical source ($V_{EE}$) by fourth and fifth resistors (68, 66) respectively, carry output terminal ($C_o$) being connected to junction of said emitter of said first output transistor (59) and said fourth resistor (68), and complementary carry output terminal ($\overline{C}_o$) being connected to junction of said emitter of said second output transistor (58) and said fifth resistor (66) to provide a carry output signal.

2. A digital computing system comprising:

a first single-bit signal source, comprising at least a one-bit binary signal source, each bit of the at least one-bit binary signal source being represented by a binary addend signal, which is provided as current differential between a first input terminal X and a complementary first terminal $\overline{X}$, a second single-bit signal source, comprising at least a one-bit binary signal source, each bit of the at least one-bit binary signal source being represented by a binary addend signal, which is provided as current differential between a second input terminal Y and a complementary second terminal $\overline{Y}$;

a single-bit output signal, comprising at least a one-bit binary signal, each bit of the at least one-bit output signal being represented by a bipolar signal, which is provided as current differential between an output terminal S and a complementary output terminal $\overline{S}$;

a single-bit arithmetic means for combining said first and second single-digit input signal sources to produce said single-digit output signal, said arithmetic means comprising sum circuit means and carry circuit means;

said sum circuit means comprises a first plurality of transistors, each transistor having respective base, emitter and collector, wherein said first plurality includes emitters of first (24) and second (25) transistors being connected to said collector on eleventh transistor (34), said emitter of said eleventh transistor (34) being connected through first resistor (35) to a source of electrical potential ($V_{EE}$), said base of said eleventh transistor (34) being connected to bias voltage source ($V_b$), carry input terminal ($C_i$) being connected to said base of said first transistor (24) and complementary carry input terminal ($\overline{C}_i$) being connected to said base of said second transistor (25) to provide a carry input signal, second input terminal (Y) being connected to said bases of third (26) and fourth (27) transistors, complementary second input terminal ($\overline{Y}$) being connected said bases of fifth (28) and sixth (29) transistors, said emitters of third (26) and said fifth (28) transistors being connected to said collector of said first transistor (24), said emitters of said fourth transistor (27) and sixth transistor (29) being connected to said collector of said second transistor (25), first input terminal (X) being connected to said bases of seventh (30) and eighth (31) transistors, complementary first input terminal ($\overline{X}$) being connected to said bases of ninth (32) and tenth (33) transistors, said emitters of seventh (30) and ninth (32) transistors being connected to said collectors of said fourth (27) and fifth (28) transistors, said emitters of said eighth (31) and tenth (33) transistors being connected to collectors of said third (26) and said sixth (29) transistors, said collectors of said seventh (30) and said tenth (33) transistors being connected to said base of first output transistor (36), said collectors of said eighth (31) and said ninth (32) transistors connected to said base of second output transistor (38), said collectors of said first and second output transistors (36, 38) and said base and said collector of twelfth transistor (40) being connected to ground, said emitter of said twelfth transistor (40) being connected by second resistor (42) to said base of said first output transistor (36), said emitter of said twelfth transistor (40) also being connected by third resistor (44) to said base of said second output transistor (38), said emitters of said first (36) and said second (38) output transistors being connected to said electrical source ($V_{EE}$) by fourth and fifth resistors (46, 47) respectively, complementary output terminal ($\overline{S}$) being connected to junction of said emitter of said second output transistor (38) and fifth resistor (47), and output terminal (S) being connected to junction of said emitter of said first output transistor (36) and said fourth resistor (46); and said carry circuit means comprises a second plurality of transistors, each transistor having respective base, emitter and collector wherein said second plurality includes emitters of first transistor (48) and second transistor (49) being connected to said collector of third output transistor (56), said emitter of said third output transistor (56) being connected through first resistor (57) to voltage source ($V_{EE}$), said base of said third output transistor (56) being connected to said bias voltage source $V_b$ carry, input terminal ($C_i$) being connected to said base of said first transistor (48), complementary carry input terminal ($\overline{C}_i$) being connected to said base of said second transistor (49) to provide the carry input signal, second input terminal (Y) being connected to said bases of third (50) and fourth (51) transistors, complementary second input terminal ($\overline{Y}$) being connected to said bases of fifth (52) and sixth (53) transistors, said emitters of said third (50) and fifth (52) transistors being connected to said collector of said first transistor (48), said emitters of said fourth (51) and sixth (53) transistors being connected to said collector of said second transistor (49), the first input terminal (X) being connected to said base of seventh transistor (54), complementary first input terminal ($\overline{X}$) being connected to said base of eighth transistor (55), said emitters of said seventh (54) and eighth (55) transistors being connected to said collectors of said fourth (51) and fifth (52) transistors, said collectors of said third (50) and seventh (54) transistors being connected to said base of said second output transistor (58), said collectors of said sixth (53) and eighth (55) transistors being connected to said base of first output transistor (59), said collectors of said second and first output transistors (58,59) and said base and said collector of ninth transistor (60) being connected to ground, said emitter of said ninth transistor (60) being connected by second resistor (62) to said base of said first output transistor (59), said emitter of said ninth transistor (60) being connected by third resistor (64) to said base of said second output transistor (58), said emitters of said first and second output transistors (59, 58) being connected to said electrical source ($V_{EE}$) by fourth and fifth resistors (68, 66) respectively, carry output terminal ($C_o$) being connected to junction of said emitter of said first output transistor (59) and said fourth resistor (68), and complementary carry output terminal ($\overline{C}_o$) being connected to junction of said emitter of said second output transistor (58) and said fifth resistor (66) to provide a carry output signal.

3. A digital computing system comprising:
a first multi-bit binary addend signal source (a), with each bit of said first multi-bit binary signal source comprising at least one-bit binary signal input source (d), each bit of said at least one-bit binary signal input source (d) being represented by a binary addend signal, which is provided as current differential between a first input terminal X and a complementary first input terminal $\overline{X}$;
a second multi-bit binary addend signal source (b), each bit of said second multi-bit binary signal source comprising at least one-bit binary signals input source (e), each bit of said at least one-bit binary signal source (e) being represented by a binary addend signal, which is provided as current differential between a second input terminal Y and a complementary second input terminal $\overline{Y}$;
a multiple-bit output signal, each bit of said output signal being represented by a bipolar signal, which is provided as current differential between terminals an output terminal S and a complementary output terminal $\overline{S}$;
an arithmetic means for computing the output signal of said first (a) and second (b) signals representing a multi-bit output signal, said arithmetic means comprising sum circuit means and carry circuit means;
said sum circuit means comprises a plurality of first transistors, each transistor having respective base, emitter and collector, wherein said first plurality includes said emitters of first (24) and second (25) transistors being connected to said collector on eleventh transistor (34), said emitter of said eleventh transistor (34) being connected through first resistor (35) to a source of electrical potential ($V_{EE}$), said base of said eleventh transistor (34) being connected to bias voltage source ($V_b$), carry input terminal ($C_i$) being connected to said base of said first transistor (24) and complementary carry input terminal ($\overline{C}_i$) being connected to said base of said second transistor (25) to provide a carry input signal, second input terminal (Y) being connected to said bases of third (26) and fourth (27) transistors, complementary input terminal ($\overline{Y}$) being connected said bases of fifth (28) and sixth (29) transistors, said emitters of third (26) and said fifth (28) transistors being connected to said collector of said first transistor (24), said emitters of said fourth transistor (27) and sixth transistor (29) being connected to said collector of said second transistor (25), first input terminal (X) being connected to said bases of seventh (30) and eighth (31) transistors, complementary first input terminal ($\overline{X}$) being connected to said bases of ninth (32) and tenth (33) transistors, said emitters of seventh (30) and ninth (32) transistors being connected to said collectors of said fourth (27) and fifth (28) transistors, said emitters of said eighth (31) and tenth (33) transistors being connected to collectors of said third (26) and said sixth (29) transistors, said collectors of said seventh (30) and said tenth (33) transistors being connected to said base of first output transistor (36), said collectors of said eighth (31) and said ninth (32) transistors connected to said base of second output transistor (38), said collectors of said first and second output transistors (36, 38) and said base and said collector of twelfth transistor (40) being connected to ground, said emitter of said twelfth transistor (40) being connected by second resistor (42) to said base of said first output transistor (36), said emitter of said twelfth transistor (40) also being connected by third resistor (44) to said base of said second output transistor (38), said emitters of said first (36) and said second (38) output transistors being connected to said electrical source ($V_{EE}$) by fourth and fifth resistors (46, 47) respectively, complementary output terminal ($\overline{S}$) being connected to junction of said emitter of said second output transistor (38) and fifth resistor (47), and output terminal (S) being connected to junction of said emitter of said first output transistor (36) and said fourth resistor (46); and
said carry circuit means comprises a second plurality of transistors, each transistor having respective base, emitter and collector wherein said second plurality includes said emitters of first transistor (48) and second transistor (49) being connected to said collector of third output transistor (56), said emitter of said third output transistor (56) being connected through first resistor (57) to voltage source ($V_{EE}$), said base of said third output transistor (56) being connected to the bias voltage source ($V_b$), carry input terminal ($C_i$) being connected to said base of said first transistor (48), complementary carry input terminal ($\overline{C}_i$) being connected to said base of said second transistor (49), second input terminal (Y) being connected to said bases of third (50) and fourth (51) transistors, complementary second input terminal ($\overline{Y}$) being connected to said bases of fifth (52) and sixth (53) transistors, said emitters of said third (50) and fifth (52) transistors being connected to said collector of said first transistor (48), said emitters of said fourth (51) and sixth (53) transistors being connected to said collector of said second transistor (49), first input terminal (X) being connected to said base of seventh transistor (54), complementary first input terminal ($\overline{X}$) being connected to said base of eighth transistor (55), said emitters of said seventh (54) and eighth (55) transistors being connected to said collectors of said fourth (51) and fifth (52) transistors, said collectors of said third (50) and seventh (54) transistors being connected to said base of said second output transistor (58), said collectors of said sixth (53) and eighth (55) transistors being connected to said base of first output transistor (59), said collectors of said second and first output transistors (58, 59) and said base and said collector of ninth transistor (60) being connected to ground, said emitter of said ninth transistor (60) being connected by second resistor (62) to said base of said first output transistor (59), said emitter of said ninth transistor (60) being connected by third resistor (64) to said base of said second output transistor (58), said emitters of said first and second output transistors (59, 58) being connected to said electrical source ($V_{EE}$) by fourth and fifth resistors (68, 66) respectively, carry output terminal ($C_o$) being connected to junction of said emitter of said first output transistor (59) and said fourth resistor (68), and complementary carry output terminal ($\overline{C_o}$) being connected to junction of said emitter of said second output transistor (58) and said fifth resistor (66) to provide a carry output signal.

4. A digital computing system comprising:
a first multi-bit binary signal (a) source, which is provided as current differential between a first input terminal X and a complementary first input terminal $\overline{X}$;
a second multi-bit binary signal (b) source, which is provided as current differential between terminals a second input terminal Y and a complementary second input terminal $\overline{Y}$;
means for summing first and second signals from said respective signal sources to produce a first binary number to be added;
a binary adder having two parallel stages, each of said two stages having first, second, third and fourth inputs and first and second outputs, and binary adder comprising sum circuit means and carry circuit means;
means for summing said multi-bit component binary signals for said first and second outputs of said binary adder, the sum of which represents the sum of the numbers represented by binary signals applied to its inputs;
means for connecting said first (a) and second (b) signal sources to the input terminals of said two parallel stages of the binary adder to produce at its outputs multi-bit component binary signals, the sum of which represents the sum of the first and second numbers;
said sum circuit means comprises a first plurality of transistors, each transistor having respective base, emitter and collector, wherein said first plurality includes said emitters of first (24) and second (25) transistors being connected to said collector on eleventh transistor (34), said emitter of said eleventh transistor (34) being connected through first resistor (35) to a source of electrical potential ($V_{EE}$), said base of said eleventh transistor (34) being connected to bias voltage source ($V_b$), carry input terminal ($C_i$) being connected to base of said first transistor (24) and complementary carry input terminal ($\overline{C_i}$) being connected to base of said second transistor (25) to provide a carry input signal, second input terminal (Y) being connected to said bases of third (26) and fourth (27) transistors, complementary second input terminal ($\overline{Y}$) being connected said bases of fifth (28) and sixth (29) transistors, said emitters of third (26) and said fifth (28) transistors being connected to said collector of said first transistor (24), said emitters of said fourth transistor (27) and sixth transistor (29) being connected to said collector of said second transistor (25), first input terminal (X) being connected to said bases of seventh (30) and eight (31) transistors, complementary first input terminal ($\overline{X}$) being connected to said bases of ninth (32) and tenth (33) transistors, said emitters of seventh (30) and ninth (32) transistors being connected to said collectors of said fourth (27) and fifth (28) transistors, said emitters of said eighth (31) and tenth (33) transistors being connected to collectors of said third (26) and said sixth (29) transistors, said collectors of said seventh (30) and said tenth (33) transistors being connected to said base of first output transistor (36), said collectors of said eighth (31) and said ninth (32) transistors connected to said base of second output transistor (38), said collectors of said first and second output transistors (36, 38) and said base and said collector of twelfth transistor (40) being connected to ground, said emitter of said twelfth transistor (40) being connected by second resistor (42) to said base of said first output transistor (36), said emitter of said twelfth transistor (40) also being connected by third resistor (44) to said base of said second output transistor (38), said emitters of said first (36) and said second (38) output transistors being connected to said electrical source ($V_{EE}$) by fourth and fifth resistors (46, 47) respectively, complementary output terminal ($\overline{S}$) being connected to junction of said emitter of said second output transistor (38) and fifth resistor (47), and complementary output terminal (S) being connected to junction of said emitter of said first output transistor (36) and said fourth resistor (46); and
said carry circuit means comprises a second plurality of transistors, each transistor having respective base, emitter and collector, wherein said second plurality includes said emitters of first transistor (48) and second transistor (49) being connected to said collector of third output transistor (56), said emitter of said third output transistor (56) being connected through first resistor (57) to voltage source ($V_{EE}$), said base of said third output transistor (56) being connected to said bias voltage source ($V_b$), carry input terminal ($C_i$) being connected to said base of said first transistor (48), complementary carry input terminal ($\overline{C_i}$) being connected to said base of said second transistor (49), second input terminal (Y) being connected to said bases of third (50) and fourth (51) transistors, complementary second input terminal ($\overline{Y}$) being connected to said bases of fifth (52) and sixth (53) transistors, said emitters of said third (50) and fifth (52) transistors being connected to said collector of said first transistor (48), said emitters of said fourth (51) and sixth (53) transistors being connected to said collector of said second transistor (49), first input terminal (X) being connected to said base of seventh transistor (54), complementary first input terminal ($\overline{X}$) being connected to said base of eighth transistor (55), said emitters of said seventh (54) and eighth (55) transistors being connected to said collectors of said fourth (51) and fifth (52) transistors, said collectors of said third (50) and seventh (54) transistors being connected to said base of said second output transistor (58), said collectors of said sixth (53) and eighth (55) transistors being connected to said base of first output transistor (59), said collectors of said second and first output transistors (58, 59) and said base and said collector of ninth transistor (60) being connected to ground, said emitter of said ninth transistor (60) being connected by second resistor (62) to said base of said first output transistor (59), said emitter of said ninth transistor (60) being connected by third resistor (64) to said base of said second output transistor (58), said emitters of said first and second output transistors (59, 58) being connected to said electrical source ($V_{EE}$) by fourth and fifth resistors (68, 66) respectively, carry output terminal ($C_o$) being connected to junction of said emitter of said first output transistor (59) and said fourth resistor (68), and complementary carry output terminal ($\overline{C}_o$) being connected to junction of said emitter of said second output transistor (58) and said fifth resistor (66) to provide a carry output signal.

* * * * *

UNITED STATES PATENT AND TRADEMARK OFFICE
CERTIFICATE OF CORRECTION

PATENT NO. : 5,132,921
DATED : July 21, 1992
INVENTOR(S) : EDWIN A. KELLEY et al.

It is certified that error appears in the above-indentified patent and that said Letters Patent is hereby corrected as shown below:

IN THE DRAWINGS:

Fig. 2 - At the top of the page, the first transistor "56" (immediately above "58") should be --59--.

Column 4, line 9, following transistor, "59" should be deleted and --58-- inserted therefor.

Claim 1, Column 8, lines 4 and 59, both appearances of "$(C_j)$" should be deleted and insert --$(C_i)$-- therefor.

Claim 1, Column 8, lines 6 and 61, both appearances of "$(\overline{C}_j)$" should be deleted and insert --$(\overline{C}_i)$-- therefor.

Claim 1, Column 9, line 4, delete "$(\overline{X})$" and insert --(X)-- therefor.

Claim 2, Column 10, line 55, delete "," which appears after "carry."

Claim 3, Column 11, lines 49-50, delete the hyphenated word "terminals."

UNITED STATES PATENT AND TRADEMARK OFFICE
CERTIFICATE OF CORRECTION

PATENT NO. : 5,132,921
DATED : July 21, 1992
INVENTOR(S) : EDWIN A. KELLEY et al.

It is certified that error appears in the above-indentified patent and that said Letters Patent is hereby corrected as shown below:

Claim 4, Column 13, line 34, delete "terminals."
Claim 4, Column 14, line 12, delete "eight" and insert --eighth-- therefor.

Signed and Sealed this

Twenty-seventh Day of December, 1994

Attest:

BRUCE LEHMAN

*Attesting Officer*   *Commissioner of Patents and Trademarks*